US010954921B2

(12) United States Patent
Nelson

(10) Patent No.: US 10,954,921 B2
(45) Date of Patent: Mar. 23, 2021

(54) SHADOW DETECTION

(71) Applicant: SIEMENS GAMESA RENEWABLE ENERGY A/S, Brande (DK)

(72) Inventor: Robert J Nelson, Orlando, FL (US)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 35 days.

(21) Appl. No.: 16/315,672

(22) PCT Filed: May 1, 2017

(86) PCT No.: PCT/US2017/030391
§ 371 (c)(1),
(2) Date: Jan. 7, 2019

(87) PCT Pub. No.: WO2018/009265
PCT Pub. Date: Jan. 11, 2018

(65) Prior Publication Data
US 2019/0242367 A1  Aug. 8, 2019

Related U.S. Application Data

(60) Provisional application No. 62/359,999, filed on Jul. 8, 2016.

(51) Int. Cl.
F03D 80/20 (2016.01)
F03D 7/02 (2006.01)

(52) U.S. Cl.
CPC ............ *F03D 80/20* (2016.05); *F03D 7/026* (2013.01); *F05B 2260/84* (2013.01); *F05B 2270/19* (2013.01); *Y02E 10/72* (2013.01)

(58) Field of Classification Search
CPC . F03D 80/20; F03D 17/00; F03D 7/00; F03D 7/026; F03D 9/25; F03D 7/0264; F03D 9/257; F03D 1/04; F03D 7/0204; F03D 7/0284; F03D 7/048; F03D 80/00; F03D 9/11; F03D 13/25; F03D 1/02; F03D 1/0625; F03D 3/005; F03D 3/061;
(Continued)

(56) References Cited

U.S. PATENT DOCUMENTS 6,661,111 B1    12/2003  Wobben
2006/0267347 A1* 11/2006 Wobben ................ F03D 7/0268
290/55

(Continued)

FOREIGN PATENT DOCUMENTS

CN    103590975 A    2/2014
DE    19928048 A1   12/1999
EP    2554836 A1    2/2013

OTHER PUBLICATIONS

Office Action in related Chinese Patent Application No. 20780042351.0, dated Nov. 14, 2019, 8 pages.
(Continued)

*Primary Examiner* — Michael P Stafira
(74) *Attorney, Agent, or Firm* — Schmeiser, Olson & Watts LLP

(57) ABSTRACT

The detecting a shadow is determined by a modeling of at least a portion of a wind turbine. First and second sensors are arranged relative to the model such that the first sensor detects a light and the second sensor detects a shadow during the conditions where the shadow would be produced.

37 Claims, 4 Drawing Sheets

(58) Field of Classification Search
CPC ........ F03D 7/02; F03D 7/0224; F03D 7/0244;
F03D 7/0272; F03D 7/04; F03D 7/042;
F03D 7/06; F03D 13/20; F03D 13/30;
F03D 15/10; F03D 1/0666; F03D 1/0675;
F03D 1/0691; F03D 3/0418; F03D
3/0427; F03D 3/062; F03D 3/065; F03D
5/06; F03D 7/0296; F03D 7/045; F03D
7/046; F03D 7/047; F03D 80/10; F03D
80/30; F03D 80/40; F03D 9/00; F03D
9/007; F03D 9/12; F03D 9/17; F03D
9/255; F03D 9/30; F03D 9/32; F03D
9/35; F03D 9/39; G01B 11/2433; G01B
11/272; G01B 11/00; G01B 11/002;
G01B 11/005; G01B 11/0666; G01B
11/162; G01B 11/2545; G01B 15/045;
G01B 1/00; G01B 5/0002; G01B 5/008;
G01B 9/02095; G01N 3/56; G01N 3/58;
G01N 21/954; G01N 1/286; G01N 1/32;
G01N 1/44; G01N 2001/2886; G01N
2021/151; G01N 2021/3531; G01N
2021/8829; G01N 21/15; G01N 21/27;
G01N 21/274; G01N 21/3504; G01N
21/4738; G01N 21/55; G01N 2201/02;
G01N 2201/061; G01N 2201/06113;
G01N 2201/0636; G01N 2201/0637;
G01N 2291/0251; G01N 25/72; G01N
29/043; G01N 29/2418; G01N 29/46;
G01N 21/8851; G01N 2291/2693; G01N
29/14; G01N 29/4454; G02B 26/0833;
G02B 2027/0178; G02B 27/017; G02B
5/09; G02B 17/008; G02B 19/0019;
G02B 19/0095; G02B 2027/0123; G02B
2027/0138; G02B 2027/014; G02B
2027/0187; G02B 26/0841; G02B
27/0006; G02B 27/0081; G02B 27/0172;
G02B 27/4272; G02B 5/08; G02B 5/12;
G02B 5/124; G02B 5/3025; G02B 5/305;
G02B 6/34; G02B 7/1827; G01J 1/4257;
G01J 1/0271; G01J 1/0403; G01J 1/0407;
G01J 1/0411; G01J 1/0414; G01J 1/42;
G01J 2001/4266; G01J 2003/1213; G01J
2003/2806; G01J 2005/202; G01J 3/0208;
G01J 3/0229; G01J 3/0256; G01J 3/0262;
G01J 3/2803; G01J 3/42; G01J 5/06;
G01J 5/0806; G01J 5/0862; G01J 5/20;
G01J 9/00; G01J 9/02; G01J 9/0215
See application file for complete search history.

(56) References Cited

U.S. PATENT DOCUMENTS

| | | | | |
|---|---|---|---|---|
| 2011/0204629 | A1* | 8/2011 | Sorensen | F03D 80/20 290/44 |
| 2015/0115610 | A1* | 4/2015 | Quinlan | F03D 17/00 290/44 |
| 2015/0124086 | A1* | 5/2015 | Melle | G01B 11/25 348/136 |
| 2015/0131084 | A1* | 5/2015 | Fucile | G01N 29/46 356/72 |
| 2015/0308406 | A1* | 10/2015 | Li | G01J 1/0403 290/44 |
| 2016/0161451 | A1* | 6/2016 | Fucile | F03B 11/00 356/72 |
| 2017/0104449 | A1* | 4/2017 | Drees | H02J 7/35 |
| 2019/0271296 | A1* | 9/2019 | Rodriguez Jimenez | F03D 80/20 |

OTHER PUBLICATIONS

International Search Report for International application No. PCT/US2017/030391 dated Jul. 18, 2017.

* cited by examiner

SHADOW DETECTION

CROSS-REFERENCE TO RELATED APPLICATIONS

This application claims priority to PCT Application No. PCT/US2017/030391, having a filing date of May 1, 2017, based off of U.S. Application No. 62/359,999, having a filing date of Jul. 8, 2016, the entire contents both of which are hereby incorporated by reference.

FIELD OF TECHNOLOGY

The present embodiments of the invention relates to a shadow detection, more particularly detecting a shadow by the wind turbine rotor using a wind turbine to model.

BACKGROUND

A shadow is a dark area which is cast onto a surface when a light source is blocked by an object. Shadow flicker is the pulsating light produced from intermittent shadows. A "shadow flicker" is caused when a rotating wind turbine blade periodically casts shadows onto a surface. This pulsating light is caused by the passage of the wind turbine blade between the sun and the surface the shadow is cast on. Typically the shadow flicker occurs when the sun is low to the horizon, such as, shortly before sundown or sunset This pulsating light can be a source of discomfort when the shadow flicker enters into the building via an opening, such as a window.

SUMMARY

Briefly described, aspects of the present disclosure relates to a model to detect a shadow by the use of a model.

A first aspect of the disclosure provides a shadow detection system, comprising a wind turbine model a first light sensor, and a second light sensor. The wind turbine model comprising a shadow casting portion. Wherein the first and second light sensors are arranged with the first light sensor detecting a light source and the second light sensor detecting a shadow between the light source and the shadow casting portion.

Another aspect of the disclosure provides an arrangement, comprising a wind turbine and the shadow detection system. The wind turbine comprising a blade arranged on a. Wherein the shadow casting portion is a scaled blade swept area of the blade, Another aspect of the disclosure provides a method of detecting a shadow. The method comprising modelling a wind turbine comprising, the model a comprising a shadow casting portion; arranging a first light sensor; and arranging a second light sensor, wherein the first and second light sensors are arranged with the first light sensor detecting a light source and the second light sensor; and detecting a shadow between the light source and the shadow casting portion.

BRIEF DESCRIPTION

Some of the embodiments will be described in detail, with reference to the following figures, wherein like designations denote like members, wherein.

DETAILED DESCRIPTION

To facilitate an understanding of embodiments, principles, and features of the present disclosure, they are explained hereinafter with reference to implementation in illustrative embodiments. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Prior solutions have been complex and expensive. The disclosed embodiments of the invention includes relatively simple solutions. Additionally, the disclosed embodiments of the invention includes solutions which may be inexpensive.

Figure 1:
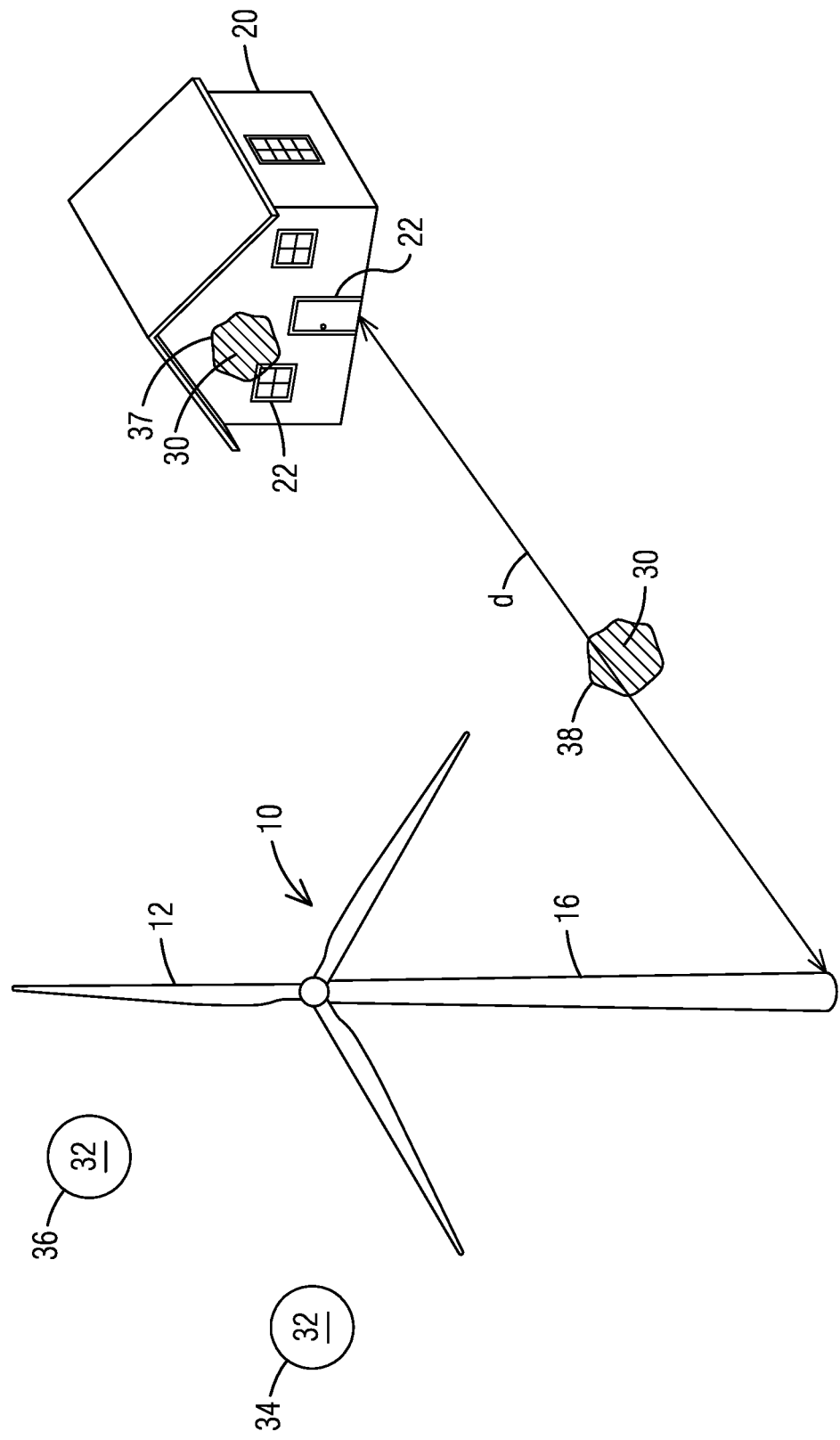
FIG. 1 illustrates an embodiment of a wind turbine arrangement in relation to a building.

FIG. 1 illustrates a wind turbine 10 arrangement in relation to a building 20. The wind turbine 10 is separated by distance d from the building 20. A shadow may be cast by the wind turbine 10, such that the location of a shadow 30 is dependent on the position 34, 36 of the sun 32 with respect to the wind turbine 10. When the sun 32 is in a first position 34, such as low on the horizon, a shadow 30 may be cast from the wind turbine 10 onto a first location 37. For example, onto the building 20. When the sun 32 is in a second position 36, such as higher in the sky than the first position 34, a shadow 30 may be cast from the wind turbine 10 onto a second location 38, for example, onto the ground. When the shadow 30 is produced from a blade 12 of the wind turbine 10, versus a stationary object, such as the tower 16, a shadow flicker can be produced. This shadow flicker may cause discomfort when cast on a building 20 and/or into the building 20 via an opening 22.

Figure 2:
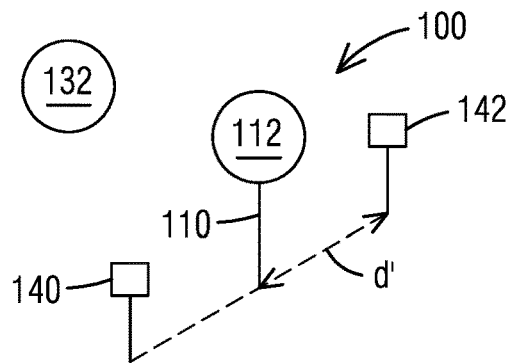
FIG. 2 illustrates a perspective view of an embodiment of a shadow detection system.

FIG. 2 illustrates a shadow detection system 100, which comprises a wind turbine model 110, a first light sensor 140, and a second light sensor 142. The first light sensor 140 is arranged, in respect to the wind turbine model 110, to detect a light source 132. The wind turbine model 110 comprises a shadow casting portion 112, which models at least portion of a blade swept area. The shadow casting portion 112 blocks the light source 132 from emitting on the second light sensor 142. The shadow casting portion 112 may comprise any material or product which a light source would not penetrate. For example, plastic, metal, tape, paint and the like. The second light sensor 142 is arranged, in respect to the wind turbine model 110, to detect an occurrence of a shadow between the light source 132 and the shadow casting portion 112.

Referring to FIG. 1 and FIG. 2, by scaling aspects of the wind turbine 10 to form the wind turbine model 110 and by arranging the second light sensor 142 at scaled distance d' from the wind turbine model 110, the shadow detection system 100 may model a shadow 30 produced between the sun the wind turbine 10 onto a building 20 or at least a portion of the building 20, such as an opening 22. The term scaling and its derivatives are defined in a section below in further detail.

In response to detecting a light by the first light sensor 140 and detecting a shadow by the second light sensor 142, the wind turbine model 110 indicates that a shadow occurs on at least a portion of the building 20. In response to detecting a light by the first light sensor 140 and also by the second light sensor 142, the wind turbine model 110 indicates that no shadow occurs on at least a portion of the building 20. Additionally, in response to not detecting a light by the first light sensor 140 the wind turbine model 110 indicates that no shadow occurs on at least a portion of the building 20.

Figure 3:
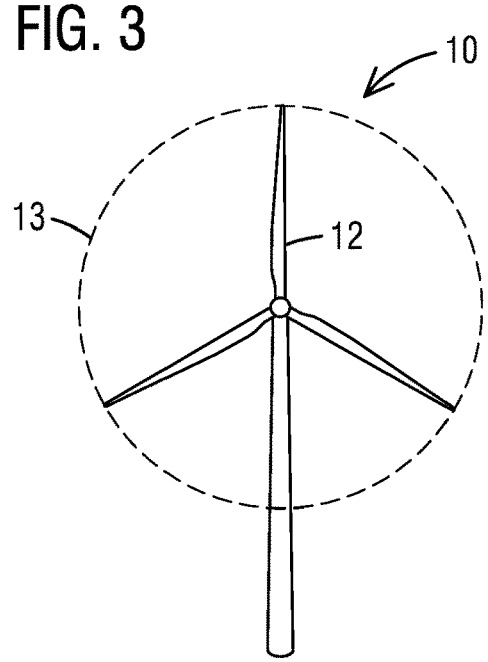
FIG. 3 illustrates a blade swept area of a wind turbine.

FIG. 3 illustrates a blade swept area 13 of wind turbine 10. The blade swept area 13 is defined herein as the area which the blade 12 of a wind turbine 10 traverses. The diameter of the blade swept area 13 equals the rotor diameter. The circumference of the blade swept area 13 represents the path of a tip of the blade 12 as it rotates.

The shadow casting portion 112 models the light source of the sun 30 being blocked by the blade 12 of the wind turbine 10 or at least a portion thereof. Thereby, the shadow casting portion 112 may be configured to model a scaled blade swept area 313, the scaled blade swept area being a representation but not necessarily the same size.

Figure 4:
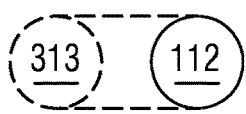
FIG. 4 illustrates an embodiment of a shadow casting portion.

According to the embodiment of the shadow casting portion 112 illustrated in FIG. 4, the shadow casting portion 112 is shaped in a form of a disk. This disk being the scaled blade swept area 313.

Figure 5:
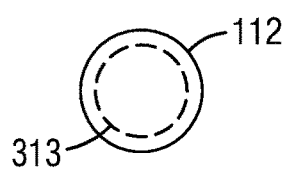
FIG. 5 illustrates an embodiment of a shadow casting portion comprising a shadow casting portion larger than the scaled blade swept area.

By making the shadow casting portion 112 larger than the scaled blade swept area 313, as illustrated in FIG. 5, a shadow may be predicted by the shadow detection system 100 before it occurs. For example, the shadow casting portion 112 may be increased 1% or more over a minimum dimension. In present embodiment of the shadow casting portion 112 being a disk, the minimum dimension may be the diameter of the disk or the actual area of the disk.

A large increase of the minimum dimension may reduce the accuracy of the prediction. Therefore, the increase may be restricted. For example, the increase of the shadow casting portion 112 may be less than or equal 5% over a minimum dimension of the scaled blade swept area 113. The range of increase of the minimum dimension may be greater than 0% and less than or equal to 5%. In another embodiment the minimum dimension may be 1%-5%, inclusive.

Figure 6:
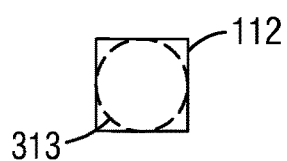
FIG. 6 illustrates a first embodiment of a shadow casting portion comprising a shadow casting portion in a geometry different than the scaled blade swept area.

According to an embodiment, the dimensions of the shape of the shadow casting portion 112 are large enough to include the scaled blade swept area 313. While the above disk example shows the shadow casting portion as being formed as a disk, the shadow casting portion 112 may be formed according to any geometric shape. The shape of the shadow casting portion 112 may or may not be similar to the shape of the scaled blade swept area 313 as illustrated in FIG. 6 For example, the shadow casting portion 112 may formed as a rectangle. When each length of the rectangle is at least the rotor diameter, the rectangular area is large enough to include the dimension of scaled blade swept area 313.

Figure 7:
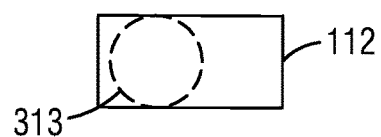
FIG. 7 illustrates a second embodiment of a shadow casting portion comprising a shadow casting portion in a geometry different than the scaled blade swept area.

Regardless of the shape, the shadow casting portion 112 may be larger 300 than the scaled blade swept area 313, as illustrated in FIG. 7, to increase a minimum dimension as described above. For example, when the shadow casting portion 112 is rectangular, the minimum dimension may be at least two parallel lengths of the rectangle. Thus, two sides of the rectangle may be increased over the size of the scaled blade swept area 313.

Figure 8:
FIG. 8 illustrates an embodiment of a shadow casting portion comprising a shadow casting portion excluding a portion of the scaled blade swept area.

The above examples illustrate when the shadow casting portion 112 includes all of the blade swept area 313. Consequently all of the positions of the blade 12 are modelled by the shape. However, it is envisioned that the shadow casting portion 112 may exclude an area of the blade swept area. Referring to FIG. 8, the shadow casting portion 112 is formed in a shape configured to model at least a portion of the scaled blade swept area 313. For example, the shadow casting portion 112 may exclude an area representing a stationary object. A stationary object may cast a shadow but since being stationary it cannot cast a flicker shadow. Such stationary objects may be part of the wind turbine 10, such as the tower 16, or maybe any other known stationary object that could obstruct the occurrence of a shadow flicker of the blade 12. A shadow casting portion 112 may be increased over a minimum dimension of the portion of the scaled blade swept area 313 as describe above.

While any geometric shape may be used for the shadow casting portion 112, a simple shape such a disk or rectangle is easily manufactured and/or produced. Accordingly, a simple shape would be more inexpensive to produce over a more complicated shape.

The shadow casting portion 112 may be static. Unlike a wind turbine 10, the wind turbine model 110 is not designed for the production of energy. Consequently, the shadow casting portion 112 does not need to move to produce energy. Furthermore, modelling the light source 30 being blocked by the blade 12 of the wind turbine 10 may not require movement of the shadow casting portion 112, for example, when the shadow casting portion 13 includes the scaled blade swept area 313 or includes all but area representing a stationary object.

Figure 9:
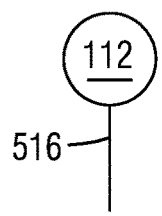
FIG. 9 illustrates a schematic view of an embodiment of a shadow casting portion mounted on a scaled tower.

The placement of the shadow casting portion 112 may be adjusted relative to a scaled height of the tower 16. A schematic view of a shadow casting portion 112 mounted on a scaled tower 516 is illustrated in FIG. 9. The wind turbine model 110 may comprise a scaled tower 516 on which shadow casting portion 112 may be mounted at the scaled height where the scaled tower 516 may be formed of any material. The scaled tower 516 may generate a shadow that is of no interest. To reduce or possibly eliminate the shadow noise, the width of the scaled tower 516 may be decreased smaller than a scaled width of the tower 16. Reduction or possibly elimination of the in appropriate tower shadow may be achieved when the scaled tower 516 is formed of a transparent material. For example, an acrylic glass may be used to form the scaled tower 116. It is also possible that the shadow casting portion 112 be suspended at the scaled height of tower 16. This may eliminate the need for the scaled turbine tower 116.

Figure 10:
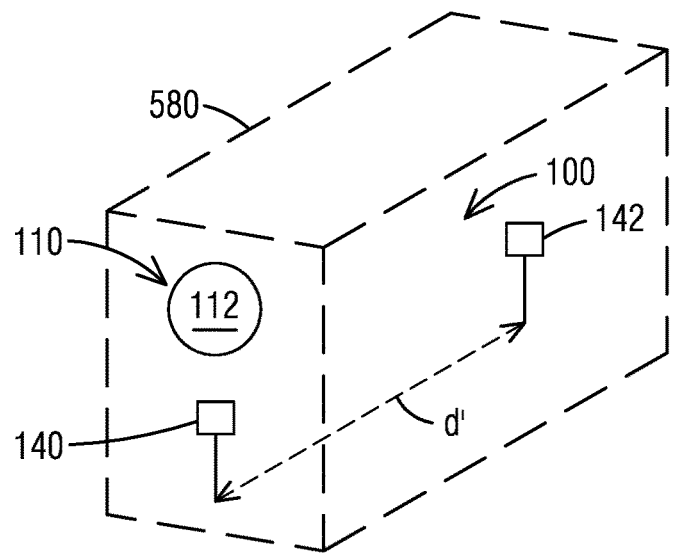
FIG. 10 illustrates a schematic view of an embodiment of a shadow casting portion mounted on a scaled tower.

Referring to FIG. 10, a schematic view of a shadow casting portion 112 on an enclosure 580 is illustrated. The wind turbine model 110 may comprise a transparent enclosure, such as acrylic where the shadow casting portion 112 is provided on the enclosure. In an embodiment the shadow casting portion 112 is attached to the enclosure 580. In another embodiment 112, the shadow casting portion is painted onto the enclosure 580. One or more of the light sensors 140, 142 may be included in the enclosure 580.

The terms scale, scaling, scaled herein may be to any ratio. This includes a wind turbine model 110 that is reduced from the wind turbine 10, increased or the same size. Practically, a model smaller than the wind turbine 10 may be less costly and more portable. The scaling of components shadow detection system 100 and scaling of distances do not have to be scaled to the same ratio to each other. For example, the ratio for scaling of the scaled tower 516 may be different from the scaling of the shadow casting portion 112. Depending on a shape of the shadow casting portion 112 or the increase the shadow casting portion 112 over a swept blade area 313, the scaling of the scaled tower 516 may be decreased. The converse of this is also true, where an increase scaling of the scaled tower 516 may allow for a decreased scaling of the shadow casting portion 112. Accordingly, flexible scaling of the shadow detection system 100 allows for variations which may allow for less manufacturing differences of components to model different wind towers.

Testing of the shadow detection system 100 may be achieved without a costly wind turbine 10 being present. Thus, the testing may be accomplished offsite from a wind turbine 10. Of course testing may be accomplished onsite with a wind turbine 10. It is possible that adjustments may be appropriate for use in the field to insure that the turbine shadows and the system shadows are properly synchronized. This could be done as part of turbine commissioning.

Adjustments may be made to shadow detection system 100 based on the testing. For example, the scaling of the blade swept area 13, the scaling of the tower 16, and/or distanced may be adjusted.

Figure 11:
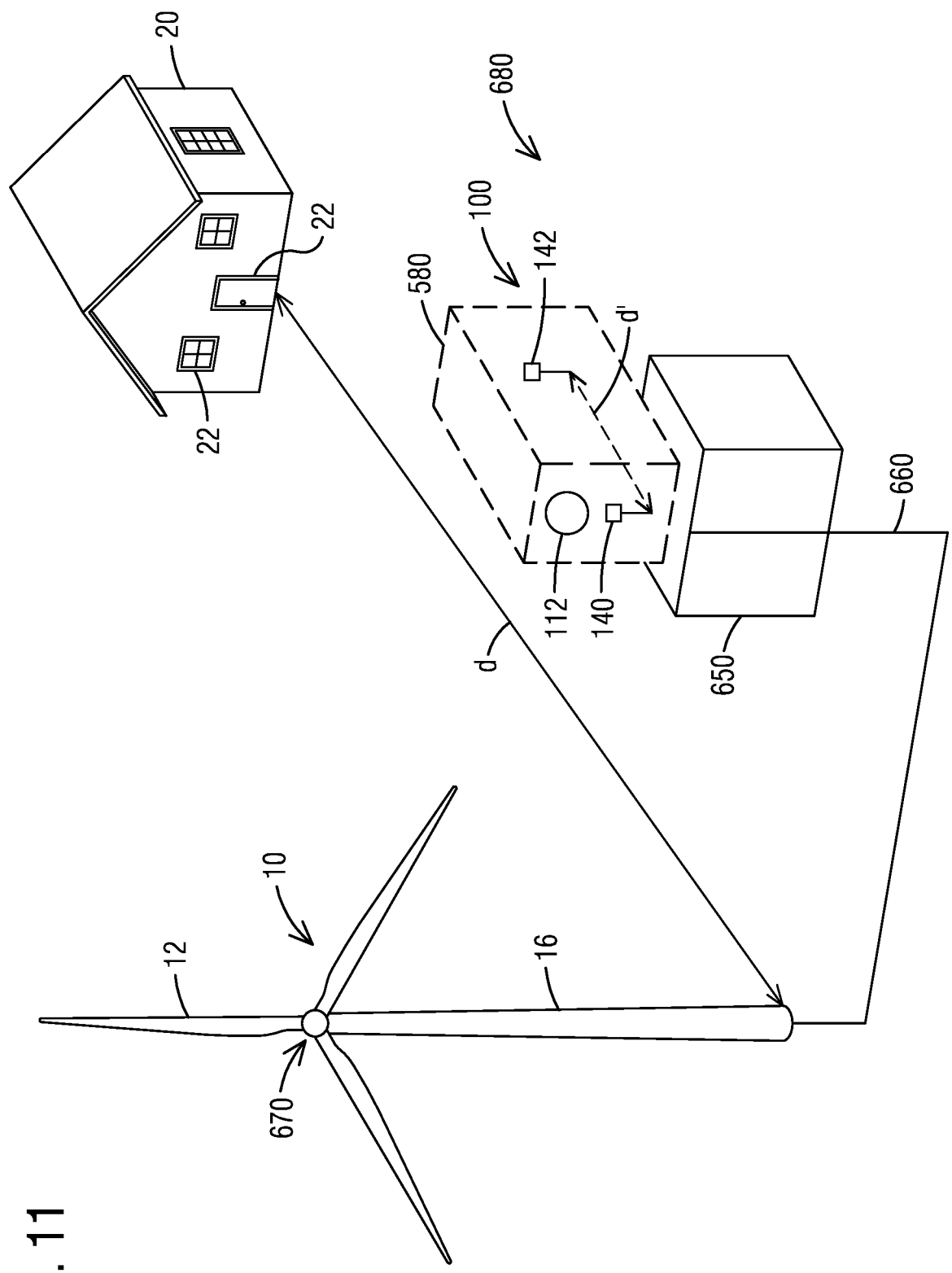
FIG. 11 illustrates a perspective view of an embodiment of an arrangement with wind turbine and a shadow detection system.

A schematic view of an arrangement 680 comprising a wind turbine 10 and a shadow detection system 100 is illustrated in FIG. 11. While the illustration uses an embodiment of FIG. 10, any of the described embodiments are suitable.

The shadow detection system 100 may be arranged near or on the wind turbine 10. According the illustrated example, the shadow detection system 100 is arranged on a turbine padmount transformer 650. The first light sensor 140 is on a front side of the shadow casting portion 112. Front as defined herein includes a plane in front of the shadow casting portion 112 as well as the plane of the shadow casting portion. This way the first light sensor 140 may be directly below or even attached onto the shadow casting portion 112. The second light sensor 142 is on a back side of the shadow casting portion 112 at a distance d' wind turbine model 110. The shadow detection system 100 models a shadow produced between the sun and the wind turbine 10 onto at least a portion of the building 20.

The shadow detection system 100 may be communicatively connected 660 to the wind turbine 10 to at least transmit data to the wind turbine 10. Data transmitted by the wind turbine 10 may include shadow indication, a shadow occurs or a shadow does not occur. Data may also be transmitted to the shadow detection system 100 by way of the connection 660. The connection 660 may a wired connection or wireless connection.

The wind turbine 10 may include a controller 670 to control a shut down and/or start-up of the wind turbine 10. The wind turbine may receive an indication of the shadow by the shadow detection system via the connection 660. In response to receiving the indication that a shadow occurs on at least a portion of the building 20, the wind turbine 10 may be shut down. The shutdown may be for specific period of time wherein the wind turbine 10 may be started after the specific period of time. The wind may be restarted after the model 100 indicates that no shadow occurs on at least portion of the building 20 or after a specific time after said condition.

Figure 12:
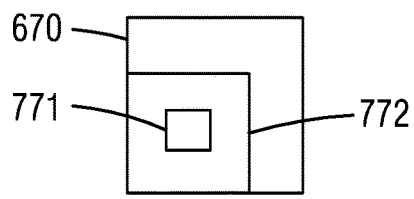
FIG. 12 illustrates a block diagram of an embodiment of a controller of a wind turbine.

The controller 670 may include one or more data item 771 in a memory 772 as illustrated in FIG. 12. The data item may be time of day, day of year, day of week, longitude of wind turbine, or latitude of wind turbine. The controller 770 may enhance the indication from the shadow detection system 100 with the one or more data item 771. For example, the controller 670 may use the data item 771 to simulate a shadow prediction. The controller 670 may override the shadow detection system 100 based on one or more data the item. For example, the shadow detection system 100 may indicate a shadow but based on the one or more data item 771 the controller determines to ignore the indication based on the one or more data item. Accordingly the operation of the wind turbine 10 may continue instead of being shut down. The opposite may also occur where the shadow detection system 100 may indicate a shadow does not occur but based on the one or more data item 771 the controller determines to ignore the indication based on the one or more data item. Accordingly the operation of the wind turbine 10 may shut down.

Figure 13:
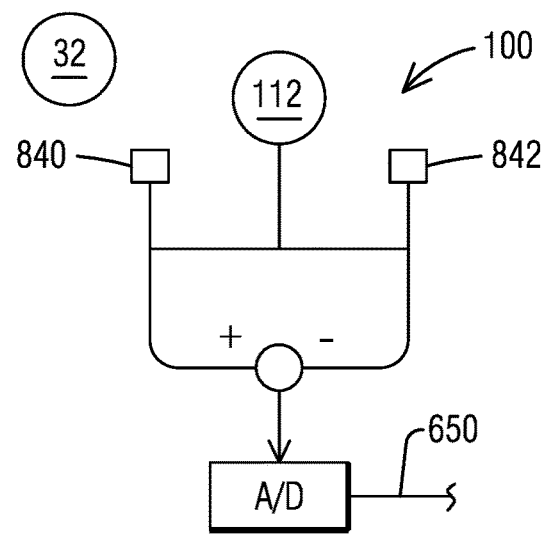
FIG. 13 illustrates an embodiment of the shadow detection system.

FIG. 13 illustrates an embodiment of the shadow detection system 100. According to the illustration, the shadow detection system includes first and second light sensors 840, 842 embodied as photovoltaic sensors. The photovoltaic sensors 840, 842 convert solar energy to electricity. A difference in voltage between the photovoltaic sensors 840, 842 indicates a shadow.

As described above, a model, such as an analog model may detect a shadow that would be produced by a wind turbine.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

What is claimed is:

1. A shadow detection system, comprising:
a wind turbine model comprising a shadow casting portion;
a first light sensor; and
a second light sensor,
wherein the first light sensor and the second light sensor are arranged with the first light sensor detecting a light source and the second light sensor detecting a shadow between the light source and the shadow casting portion;

wherein the shadow detection system is configured to transmit an indication of the shadow to a controller of a wind turbine.

2. The shadow detection system as claimed in claim 1, wherein the shadow casting portion is static.

3. The shadow detection system 100 as claimed in claim 1, wherein the shadow casting portion is configured to model at least a portion of a scaled blade swept area.

4. The shadow detection system as claimed in claim 3, wherein the shadow casting portion is configured to include all of the scaled blade swept area.

5. The shadow detection system as claimed in claim 3, wherein the shadow casting portion is configured to exclude an area of the scaled blade swept area.

6. The shadow detection system as claimed in claim 3 wherein the shadow casting portion is larger than the scaled blade swept area.

7. The shadow detection system as claimed in claim 6, wherein the shadow casting portion is increased 1% or more over a minimum dimension.

8. The shadow detection system as claimed in claim 7, wherein the increase of the shadow casting portion is less than or equal to 5% over the minimum dimension.

9. The shadow detection system as claimed in claim 6, wherein the increase of the shadow casting portion is greater or equal to 1% over the minimum dimension and less than or equal to 5% over the minimum dimension.

10. The shadow detection system as claimed in claim 1, wherein the shadow casting portion is a disk.

11. The shadow detection system as claimed in claim 1, wherein the first light sensor is arranged on a front side of the shadow casting portion, and the second light sensor is arranged on a back side of the blade shadow.

12. The shadow detection system as claimed in claim 1, wherein the first light sensor and the second light sensor are photovoltaic sensors, further wherein a voltage difference between the photovoltaic sensors indicates that a shadow occurs.

13. An arrangement, comprising:
the wind turbine comprising a blade arranged on a tower; and
the shadow detection system as claimed in claim 1, wherein the shadow casting portion is a scaled blade swept area of the blade.

14. The arrangement according to claim 9, wherein the controller is configured to control a shut down and/or start up of the wind turbine via a connection between the wind turbine and the shadow detection system, wherein the wind turbine receives the of the shadow by the shadow detection system via the connection.

15. The arrangement according to claim 14, wherein an operation of the wind turbine is effected based on the received indication.

16. The arrangement according to claim 14, wherein the controller comprises a memory which comprises one or more data items, the controller configured to ignore a shadow indication by the shadow detection system based on the one or more data item.

17. The arrangement according to claim 15, wherein the data items is selected from the group consisting of time of day, day of year, day of week, longitude of wind turbine, and latitude of wind turbine.

18. The arrangement according to claim 1, wherein the shadow detection system is analog.

19. A method of detecting a shadow, comprising:
modeling a wind turbine to create a wind turbine model comprising a shadow casting portion;
arranging a first light sensor; and arranging a second light sensor, wherein the first light sensor and the second light sensor are arranged with the first light sensor detecting a light source and the second light sensor;
detecting a shadow between the light source and the shadow casting portion; and
transmitting an indication of the shadow to a controller of the wind turbine.

20. The method as claimed in claim 19, wherein the shadow casting portion is static.

21. The method as claimed in claim 19, comprising configuring the shadow casting portion to model at least a portion of a scaled blade swept area.

22. The method as claimed in claim 21, wherein the shadow casting portion is configured to include all of the scaled blade swept area.

23. The method as claimed in claim 21, wherein the shadow casting portion is configured to exclude an area of the scaled blade swept area.

24. The method as claimed in claim 21, wherein the shadow casting portion is larger than the scaled blade swept area.

25. The method as claimed in claim 24, wherein the shadow casting portion is increased 1% or more over a minimum dimension.

26. The method as claimed in claim 25, wherein the increase of the shadow casting portion is less than or equal to 5% over the minimum dimension.

27. The method as claimed in claim 24, wherein the increase of the shadow casting portion is greater or equal to 1% over the minimum dimension and less than or equal to 5% over the minimum dimension.

28. The method as claimed in claim 19, wherein the shadow casting portion is a disk.

29. The method as claimed in claim 19, wherein the first light sensor is arranged on a front side of the shadow casting portion, and the second light sensor is arranged on a back side of the blade shadow.

30. The method as claimed in claim 19, wherein the first light sensor and the second light sensor are photovoltaic sensors, wherein a voltage difference between the photovoltaic sensors indicates that a shadow occurs.

31. The method as claimed in claim 19, comprising shutting down a wind turbine in response to an indication from the shadow detection system.

32. The arrangement according to claim 1, comprising:
a transparent enclosure, wherein the shadow casting portion is on the transparent enclosure.

33. The arrangement according to claim 32, wherein the shadow casting portion is painted on the transparent enclosure.

34. The arrangement according to claim 33, wherein at least one of the first light sensor and the second light sensor are within the transparent enclosure.

35. The method as claimed in claim 19, comprising:
a transparent enclosure, wherein the shadow casting portion is on the transparent enclosure.

36. The method as claimed in claim 35, wherein the shadow casting portion is painted on the transparent enclosure.

37. The method as claimed in claim 36, wherein at least one of the first light sensor and the second light sensor are within the transparent enclosure.

* * * * *